United States Patent [19]

Makino

[11] 4,341,502

[45] Jul. 27, 1982

[54] ASSEMBLY ROBOT

[76] Inventor: Hiroshi Makino, 1013 Haguro-cho, Kofu City, Yamanashi Prefecture, Japan

[21] Appl. No.: 133,287

[22] Filed: Mar. 24, 1980

[30] Foreign Application Priority Data

Oct. 12, 1979 [JP] Japan ................... 54-131983

[51] Int. Cl.³ .......... B25J 13/00; B25J 1/12; G05G 11/00
[52] U.S. Cl. ............... 414/744 R; 414/917; 74/479
[58] Field of Search .......... 414/744 R, 744 A, 744 B, 414/744 C, 917, 680, 733; 74/479, 480 R, 480 B

[56] References Cited

FOREIGN PATENT DOCUMENTS 738760 7/1943 Fed. Rep. of Germany ... 414/744 A
52-31456 9/1977 Japan .................... 74/479

Primary Examiner—Robert W. Saifer
Attorney, Agent, or Firm—Wenderoth, Lind & Ponack

[57] ABSTRACT

An assembly robot includes a quadrilateral link mechanism formed by plurality of links. Swinging or movement devices are connected to two adjacent links and are supported by a base. An assembling tool is installed at a connection of two other links opposite the moving devices.

7 Claims, 6 Drawing Figures

ASSEMBLY ROBOT

BACKGROUND OF THE INVENTION

1. Field of the Invention

This invention relates to an assembly robot by which parts can be assembled automatically at a high speed. This invention also relates to an improvement of the invention of Japanese patent application No. 21161/1979 (Assembly robot) filed Feb. 23, 1979.

2. Description of the Prior Art

Hitherto, a rectangular coordinated robot and a cylindrical coordinated robot have been well known as types of assembly robots. However, with these known robots, the working ranges are relatively small and the degrees of movement in each direction are the same. This leads to the fact that when these robots conduct an assembling operation, for instance to insert a peg into a hole, the peg cannot be controlled with regard to suitable position and attitude. Thus, these robots have the defect of causing jamming at the entrance of the hole.

In order to avoid such defect, Japanese application No. 21161/79 discloses an assembly robot having a selective movement or compliance, i.e., directionally different compliance, and having a multiple jointed arm construction provided with more than two shafts to give two dimensional locational coordinates to the assembly tool. A second link (second arm) is connected swingingly to the end of a first link (first arm), and swinging devices are connected to each of the first and second links. However, it has become evident that the swinging device connected to the second link becomes a weight load on the swinging device of the first link, and therefore that if the weight of the swinging device connected to the second link is heavy, the operational speed of the assembly robot will be reduced.

SUMMARY OF THE INVENTION

An object of this invention is to provide an improved assembly robot which avoids the aforementioned problem of weight load on the swinging device, which is capable of operating at a high speed, which is selective, which has a wide working area and which controls the position and attitude of the workpiece.

This object is achieved in accordance with the present invention by the provision of an assembly robot including a quadrilateral link mechanism constructed of four links. Movement devices are connected to each of the first and fourth links. An assembling tool is mounted at the connection of the second and third links. Each of the first and fourth links are concentrically mounted on a base. In some cases, it is possible to connect the first and the fourth links to the base non-concentrically, or to construct the link system in the style of a Y-shape.

The invention will be described in detail hereinafter with reference to the accompanying drawings.

DESCRIPTION OF THE PREFERRED EMBODIMENTS

Figure 1:
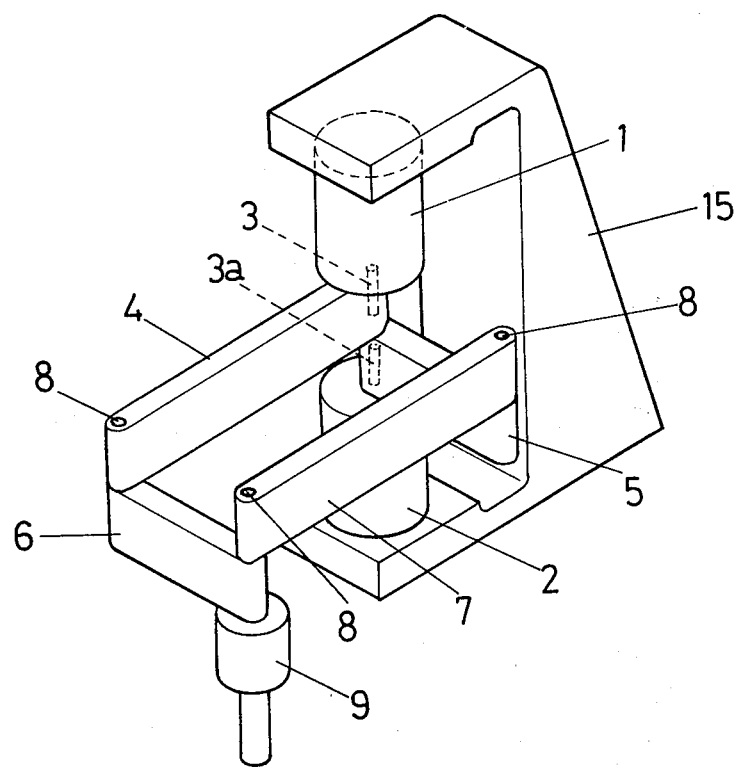
FIG. 1 is a perspective view of an assembly robot according to one embodiment of the invention.

In FIG. 1, shafts 3, 3a of motors 1, 2 which are installed on a base 15 are aligned concentrically. A first link 4 is connected with the shaft 3 of the motor 1, a fourth link 5 is connected with the shaft 3a of the motor 2, and the first and fourth links are rotated about the axes of shafts 3,3a by the motors 1, 2. A second link 6 and fourth link 5 are of equal length and extend parallelly, and also a third link 7 and first link 4 are of equal length and extend parallelly.

A parallelogram link system is formed by successive joining of the first, second, third and fourth links by shafts 8, and an assembling tool 9 is installed at the shaft 8 opposite to shafts 3,3a.

Figure 2:
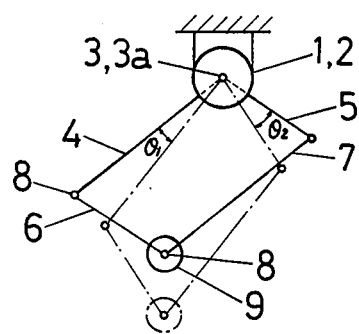
FIG. 2 is a plan diagram showing the movement of the robot shown in FIG. 1.

In the assembly robot of this embodiment, as shown in FIG. 2, the rotating angles $\theta_1, \theta_2$ of the first link 4 and fourth link 5 are determined by the motors 1, 2 (usually servo motors with reduction gearing mechanisms are used) to control the position of the assembling tool 9. Therefore, if the first, second, third and fourth links are made of light weight material, the inertia moment which is caused by the weight load to the motors 1,2 will be determined mainly by the weight of the assembling tool 9, so that the robot can be operated at a high speed.

Figure 3:
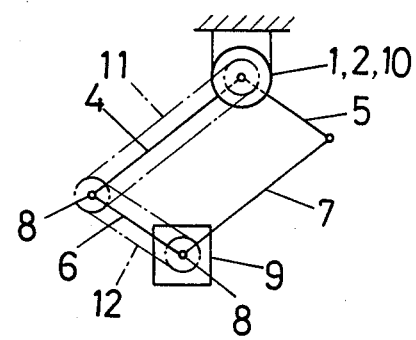
FIGS. 3 to 6 are plan diagrams similar to FIG. 2, but showing other embodiments of the invention.

FIGS. 3 to 6 show other embodiments of the invention. The embodiment shown in FIG. 3 is of a type of assembly robot which is equipped with a motor 10 mounted concentrically to the shafts 3,3a of motors 1, 2, and belt devices 11, 12 are installed along the first link 4 and second link 6, by shafts 8. Therefore, the assembly tool 9 may be rotated by the motor 10, the belt devices 11, 12 and the shaft 8 at which tool 9 is mounted.

In the aforementioned embodiment, the position of the assembling tool 9 can be controlled two dimensionally, and also the attitude or rotational angle of the assembling tool 9 can be controlled.

Figure 4:
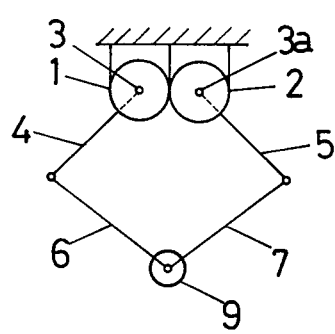

The embodiment shown in FIG. 4 is an assembly robot in which the shaft 3 of the motor 1 connected with first link 4 and the shaft 3a of the motor 2 connected with fourth link 5 are not arranged concentrically, but are separated.

In the aforementioned embodiment, the link mechanism does not form a parallelogram, but the positional coordinates of the assembling tool 9 are capable of being controlled by controlling the rotating angles of the first link 4 and the fourth link 5.

Figure 5:
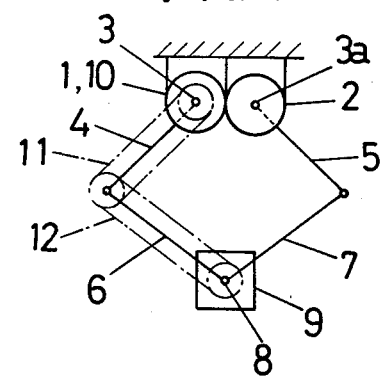

The embodiment shown in FIG. 5 is an assembly robot having a construction combining the features of the embodiments of FIG. 3 and FIG. 4.

In the aforementioned embodiment, a motor 10 is installed concentrically to the motor 1, the shaft of motor 10 and the shaft of assembling tool 9 being engaged with the belt devices 11, 12 as in the embodiment shown in FIG. 3, so that the attitude of the assembling tool 9 can be controlled.

Figure 6:
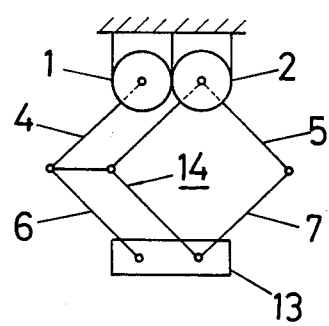

The embodiment shown in FIG. 6 is an assembly robot in which the assembling tool 13 is maintained in a parallel alignment while being moved.

In the aforementioned embodiment, the positions of connection of the first link 4 and the fourth link 5 to the base are apart from each other as in the embodiment in FIG. 4. Also, the connecting positions of the second link 6 and the third link 7 are apart from each other, with adjacent ends of the links 6,7 being connected to the assembling tool 13. A Y-shaped link mechanism 14 is connected to the joint between the first link 4 and the second link 6, to the connection point of the fourth link 5 to the base, and to the connection point of the third link 7 to the assembling tool 13. In the aforementioned embodiment three groups of parallelogram link mechanisms are formed, so that the location of assembling tool 13 may be determined and moved while being maintained in the same attitude, by rotating the first link 4 and the fourth link 5 by the motors 1, 2.

The assembly robot according to the present invention has a construction in which a quadrilateral link mechanism is formed by a plurality of links, a rotating device being connected to the links and installed on a base, and with an assembling tool installed at a connection of the links. Accordingly, the moving parts of the robot are only the transmitting devices, such as links and belt devices, so that the weight of the entire unit can be reduced. Therefore, the assembly robot provides the advantages of higher speed of transferring and assembling. It has been determined that the assembling speed can be at a rate of one or more pieces per second.

I claim:

1. An assembly robot comprising:
   a link mechanism formed of four links and movable in a horizontal plane, a first said link being pivotally connected to a second said link about a first vertical axis, said second said link being pivotally connected to a third said link about a second vertical axis, and said third link being pivotally connected to a fourth said link about a third vertical axis;
   a base;
   a first motor mounted on said base and having a vertical shaft fixed to said first link;
   a second motor mounted on said base and having a vertical shaft fixed to said fourth link;
   said shafts of said first and second motors being vertically concentrically aligned; and
   an assembly tool mounted on said second vertical axis, whereby operation of said first and second motors rotates said first and fourth links about the axes of said motor shafts and thereby causes said link mechanism to move horizontally the position of said assembly tool.

2. An assembly robot as claimed in claim 1, further comprising a third motor having a shaft aligned concentrically with said shafts of said first and second motors, said shaft of said third motor and said first and second axes having first, second and third belt supporting members, respectively, a first belt extending along said first link between said first and second belt supporting members, and a second belt extending along said second link between said second and third belt supporting members, whereby operation of said third motor drives said first and second belts and thereby rotates said second axis and said assembly tool independently of movement of the horizontal position of said assembly tool.

3. An assembly robot comprising:
   a link mechanism formed of four links, a first said link being pivotally connected to a second said link about a first axis, said second link being pivotally connected to a third said link about a second axis, and said third link being pivotally connected to a fourth said link about a third axis;
   a base;
   a first motor mounted on said base and having a shaft fixed to said first link;
   a second motor mounted on said base and having a shaft fixed to said fourth link;
   said shafts of said first and second motors extending parallel but non-concentrically with respect to each other; and
   an assembly tool mounted on said second axis, whereby operation of said first and second motors rotates said first and fourth links about the axes of said motor shafts and thereby causes said link mechanism to move the position of said assembly tool within the plane of said link mechanism.

4. An assembly robot as claimed in claim 3, wherein said shafts of said first and second motors and said first, second and third axes extend vertically, and said link mechanism and said assembly tool are movable in a horizontal plane.

5. An assembly robot as claimed in claim 3, further comprising a third motor having a shaft aligned concentrically with said shaft of said first motor, said shaft of said third motor and said first and second axes having first, second and third belt supporting members, respectively, a first belt extending along said first link between said first and second belt supporting members, and a second belt extending along said second belt between said second and third belt supporting members, whereby operation of said third motor drives said first and second belts and thereby rotates said second axis and said assembly tool independently to movement of the position of said assembly tool in the plane of said link mechanism.

6. An assembly robot comprising:
   a base;
   a first motor mounted on said base and having a shaft;
   a second motor mounted on said base and having a shaft;
   said shafts of said first and second motors extending parallel but non-concentrically with respect to each other;
   an assembly tool;
   a first link fixed to said shaft of said first motor;
   a second link pivotally connected to said first link about a first axis and pivotally connected to said assembly tool about a second axis;
   a third link pivotally connected to said assembly tool about a third axis extending parallel to but non-concentric with respect to said second axis;
   a fourth link pivotally connected to said third link about a fourth axis and fixed to said shaft of said second motor; and
   a Y-shaped link mechanism including first, second and third link arms pivotally connected about a fifth axis, said first link arm being pivotally connected to said first axis, said second link arm being pivotally connected to said third axis, and said third link arm being pivotally connected to said shaft of said second motor, whereby operation of said first and second motors rotates said first and fourth links about the axes of said motor shafts and causes said links and said link mechanism to move said assembly tool within the plane thereof without altering the relative alignment or attitude of said assembly tool.

7. An assembly robot as claimed in claim 6, wherein said shafts and said axes all extend vertically, and said link mechanism and said assembly tool are movable in a horizontal plane.

* * * * *